US008249343B2

(12) United States Patent
Perronnin et al.

(10) Patent No.: US 8,249,343 B2
(45) Date of Patent: Aug. 21, 2012

(54) REPRESENTING DOCUMENTS WITH RUNLENGTH HISTOGRAMS

(75) Inventors: Florent C. Perronnin, Domene (FR); Damien Cramet, Grenoble (FR); Francois Ragnet, Venon (FR)

(73) Assignee: Xerox Corporation, Norwalk, CT (US)

( * ) Notice: Subject to any disclaimer, the term of this patent is extended or adjusted under 35 U.S.C. 154(b) by 969 days.

(21) Appl. No.: 12/251,689

(22) Filed: Oct. 15, 2008

(65) Prior Publication Data
US 2010/0092084 A1   Apr. 15, 2010

(51) Int. Cl.
G06K 9/00 (2006.01)
G06K 9/34 (2006.01)
G06K 9/62 (2006.01)

(52) U.S. Cl. .................. 382/168; 382/173; 382/224

(58) Field of Classification Search .......... 382/168, 382/173, 224
See application file for complete search history.

(56) References Cited

U.S. PATENT DOCUMENTS

| | | | | |
|---|---|---|---|---|
| 4,668,995 | A | * | 5/1987 | Chen et al. ............... 382/272 |
| 4,949,392 | A | | 8/1990 | Barski et al. |
| 5,038,381 | A | | 8/1991 | Nelson |
| 5,335,290 | A | | 8/1994 | Cullen et al. |
| 5,592,226 | A | * | 1/1997 | Lee et al. ............... 375/240.14 |
| 5,822,454 | A | | 10/1998 | Rangarajan |
| 5,832,118 | A | * | 11/1998 | Kim ......................... 382/224 |
| 6,014,450 | A | * | 1/2000 | Heilper et al. ........... 382/101 |
| 6,141,464 | A | | 10/2000 | Handley |
| 6,542,635 | B1 | * | 4/2003 | Hu et al. ................... 382/173 |
| 6,564,202 | B1 | * | 5/2003 | Schuetze et al. .............. 1/1 |
| 6,922,699 | B2 | * | 7/2005 | Schuetze et al. .............. 1/1 |
| 6,941,321 | B2 | * | 9/2005 | Schuetze et al. .............. 1/1 |
| 7,053,939 | B2 | * | 5/2006 | Lin et al. ................... 348/239 |
| 7,124,149 | B2 | | 10/2006 | Smith et al. |
| 7,162,080 | B2 | * | 1/2007 | Chui et al. ................. 382/168 |
| 7,248,737 | B2 | * | 7/2007 | Chakraborty ............. 382/176 |
| 2007/0005356 | A1 | | 1/2007 | Perronnin |
| 2007/0258648 | A1 | | 11/2007 | Perronnin |
| 2008/0069456 | A1 | | 3/2008 | Perronnin |
| 2009/0074291 | A1 | * | 3/2009 | Iinuma ..................... 382/178 |

OTHER PUBLICATIONS

Imade, S.; Tatsuta, S.; Wada, T.; , "Segmentation and classification for mixed text/image documents using neural network," Document Analysis and Recognition, 1993., Proceedings of the Second International Conference on , vol., no., pp. 930-934, Oct. 20-22, 1993.*
Csurka, et al., Visual Categorization with Bags of Keypoints, *ECCV Workshop on Statistical Learning in Computer Vision*, 2004.
U.S. Appl. No. 11/947,859, filed Nov. 30, 2007, Liu, et al.

* cited by examiner

*Primary Examiner* — Bhavesh Mehta
*Assistant Examiner* — Utpal Shah
(74) *Attorney, Agent, or Firm* — Fay Sharpe LLP

(57) ABSTRACT

An apparatus and method are provided for generating a representation of an image which may be used in tasks such as classification, clustering, or similarity determination. An image, such as a scanned document, in which the pixel colorant values are quantized into a plurality of colorant quantization levels, is partitioned into regions, optionally at a plurality of different scales. For each region, a runlength histogram is computed, which may be a combination of sub-histograms for each of the colorant quantization levels and optionally each of plural directions. The runlength histograms, optionally normalized, can then be combined to generate a representation of the document image.

24 Claims, 5 Drawing Sheets

REPRESENTING DOCUMENTS WITH RUNLENGTH HISTOGRAMS

CROSS REFERENCE TO RELATED PATENTS AND APPLICATIONS

The following copending application, the disclosure of which is incorporated herein by reference in its entirety, is mentioned:

U.S. application Ser. No. 11/947,859, filed Nov. 30, 2007, entitled OBJECT COMPARISON, RETRIEVAL, AND CATEGORIZATION METHODS AND APPARATUSES, by Y. Liu and F. Perronnin.

BACKGROUND

The exemplary embodiment relates to image processing. It finds particular application in connection with an apparatus and method for generation of a representation of an image based on runlength histograms. Implementations of the apparatus and method include retrieval, categorization, and clustering applications, but it is to be appreciated that they are not limited to such applications.

In data processing, some useful operations include automatic or semi-automatic image categorization, automated or semi-automated retrieval of similar images, and clustering of images. For example, given an unorganized database of scanned images of documents, it may be useful to sort or categorize the images into classes such as the type of document. There are many applications where documents are currently manually sorted according to type, such as tax forms, medical records, or the like and which could benefit from an automated determination as to whether the document is a particular type of form or particular page of a form without the need for optical character recognition. Subsequent processing of the document or document pages could then be based on the determination. In a related application, given a particular document image, it may be useful to identify and retrieve similar images from the database of images.

To enable such techniques to be performed automatically or semi-automatically, some mechanism for automated image characterization based on the content of the image is desirable. Since a digital image is essentially in the form of pixel values, e.g., colorant values, for each of typically millions of pixels, image characterization techniques typically rely on extracting features from the image based on small segments of the image, referred to as patches. Techniques have been developed for categorizing images which rely on training a classifier, or set of classifiers, with information extracted from a large number of training images. The training images are manually labeled with one or more of a set of predefined object categories, such as person, landscape, animal, building, and the like. The classifier learns how to characterize a new image based on its extracted features and the extracted features of the labeled images. Such techniques, however, are manually intensive in the training phase, often requiring the manual labeling of a large number of images for each class for which the classifier is to be trained. Additionally, they do not readily adapt to the case of scanned documents where the documents may be scanned upside down.

There remains a need for an automated method for generating a representation of an image, such as a scanned document, which is readily implemented.

Incorporation By Reference

The following references, the disclosures of which are incorporated herein in their entireties by reference, are mentioned.

U.S. Pub. No. 2007/0005356, entitled GENERIC VISUAL CATEGORIZATION METHOD AND SYSTEM, U.S. Pub. No. 2007/0258648, entitled GENERIC VISUAL CLASSIFICATION WITH GRADIENT COMPONENTS-BASED DIMENSIONALITY ENHANCEMENT, and U.S. Pub. No. 2008/0069456 entitled BAGS OF VISUAL CONTEXT-DEPENDENT WORDS FOR GENERIC VISUAL CATEGORIZATION, all by Florent Perronnin, and G. Csurka, C. Dance, L. Fan, J. Willamowski and C. Bray, "Visual Categorization with Bags of Keypoints", ECCV workshop on Statistical Learning in Computer Vision, 2004, disclose systems and methods for categorizing images based on content.

U.S. Pat. No. 7,124,149, issued Oct. 17, 2006, entitled METHOD AND APPARATUS FOR CONTENT REPRESENTATION AND RETRIEVAL IN CONCEPT MODEL SPACE, by Smith, et al., discloses a method and apparatus for extracting a model vector representation from multimedia documents. A model vector provides a multidimensional representation of the confidence with which multimedia documents belong to a set of categories or with which a set of semantic concepts relate to the documents. The model vector can be associated with multimedia documents to provide an index of its content or categorization and can be used for comparing, searching, classifying, or clustering multimedia documents.

U.S. Pat. No. 4,949,392, issued Aug. 14, 1990, entitled DOCUMENT RECOGNITION AND AUTOMATIC INDEXING FOR OPTICAL CHARACTER RECOGNITION, by Barski, et al., discloses a method in which a library of templates defining the spacings between pre-printed lines and the corresponding line lengths for a plurality of different business forms is compared with the image data of an unknown document to determine the known business form (template) to which the document corresponds.

U.S. Pat. No. 5,335,290, issued Aug. 2, 1994, entitled SEGMENTATION OF TEXT, PICTURE AND LINES OF A DOCUMENT IMAGE, by Cullen, et al, discloses a method and apparatus for segmenting a document image into areas containing text and non-text. From a bit-mapped representation of the document image, run lengths are extracted for each scanline. Rectangles are constructed from the run lengths. The method includes classifying each of the rectangles as either text or non-text; correcting for the skew in the rectangles, merging associated text into one or more text blocks, and logically ordering the text blocks.

U.S. Pat. No. 5,822,454, issued Oct. 13, 1998, entitled SYSTEM AND METHOD FOR AUTOMATIC PAGE REGISTRATION AND AUTOMATIC ZONE DETECTION DURING FORMS PROCESSING, by Rangarajan, discloses a system which automatically detects user defined zones in a document image of a form, compensating for skew and displacement of the image with respect to an original image of a form. The system further processes the image to remove horizontal and vertical lines, and to create a number of blocks, representing either text or image data. The lines are removed and the blocks formed by runlength smoothing with various parameters. The blocks are labeled such that any set of connected blocks share a unique identification value. Additional data is collected on the commonly labeled blocks to select those blocks useful to definition of a template. The template is a collection of vectors between the centroids of each of the selected blocks. A second document image for processing is obtained, and similarly processed to minimize, deskew, and identify blocks and vectors therein. The vectors in the second document image are compared with vectors in a user selected template to determine the location of user defined zones in the second document image.

U.S. Pat. No. 5,832,118, issued Nov. 3, 1998, entitled TEXTURE CLASSIFICATION APPARATUS EMPLOYING COARSENESS AND DIRECTIVITY OF PATTERNS, by Kim, discloses an apparatus for classifying a textured image based on pattern coarseness and directivity. The apparatus includes a quantizer for obtaining a quantized image from the textured image, the quantized image containing a plurality of pixels each of which is represented by one of N quantized values, N being a positive integer, a scanning block for scanning the quantized image along M scanning directions, M being a positive integer, to thereby provide M scanned images, a grey level mean runlengths configuration block for providing a set of runlengths by counting runlengths of pixels having a same quantized value, for each of the M scanned images and each of the N quantized values, to thereby provide M×N sets of runlengths, providing M×N mean runlengths by averaging each set of runlengths, and forming an M×N matrix whose elements are the mean runlengths. A pattern coarseness decision block determining a coarseness of the textured image by using the matrix; pattern directivity decision block for determining a directivity of the textured image by using the matrix; and texture classification block for classifying the textured image according to the coarseness and the directivity.

U.S. Pat. No. 6,141,464, issued Oct. 31, 2000, entitled ROBUST METHOD FOR FINDING REGISTRATION MARKER POSITIONS, by Handley, discloses a method and system for detecting registration markers having the shape of an 'X' on a scanned test target used to calibrate an image processing system. A captured image is converted to a binary image and then segmented into a list of eight-connected components. A set of features is extracted from each component in the list. An accurate decision rule is executed on each component. If a component is found to be a marker, its centroid is returned as its position.

BRIEF DESCRIPTION

In accordance with one aspect of the exemplary embodiment, a method for generating a representation of an image includes receiving an image for which a representation is to be generated and, for each of a plurality of regions of the image, computing a runlength histogram. A representation of the image is generated based on the runlength histograms and is output.

In accordance with another aspect of the exemplary embodiment, a computer implemented apparatus for generating an image representation of a document image includes memory for storing a received document image, a region extraction component which extracts a plurality of regions in the document image, optionally at two or more different scales, a histogram generation component which extracts at least one runlength histogram in each region and combines the histograms corresponding to the different regions, and an output component which outputs a representation of the image based on the combined histograms.

In accordance with another aspect of the exemplary embodiment, a method for generating a representation of an image includes scanning a document to generate an image of the document, quantizing pixel colorant values into N colorant quantization levels, partitioning the document into regions at a plurality of different scales, and for each region of the image, computing a runlength histogram comprising values for each of the N colorant quantization levels and for each of L directions, were N and L are respectively at least two. A representation of the document image is generated, based on the runlength histograms.

DETAILED DESCRIPTION

Figure 1:
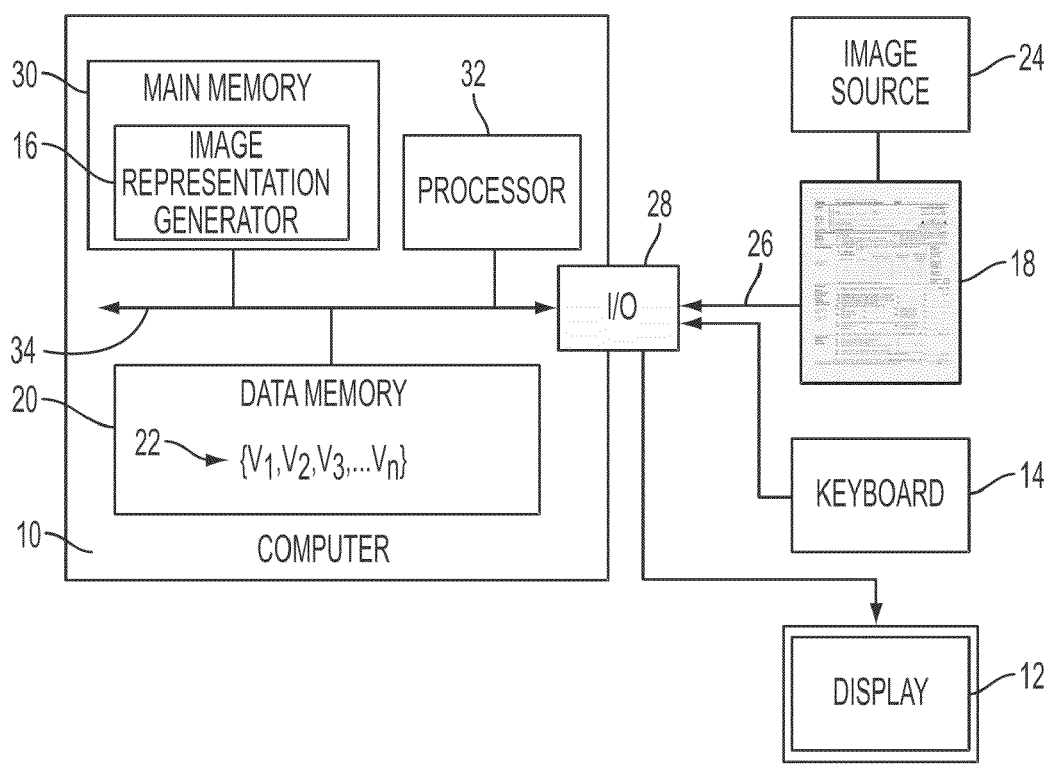
FIG. 1 is a functional block diagram of an exemplary apparatus for generating a representation of a digital image.

The exemplary embodiment relates to an apparatus, method, and computer program product for generating a representation of an image which may find application in a variety of image processing operations including image categorization, image retrieval, clustering of images, and the like. The method and apparatus are particularly suited to document processing, and especially form processing, without the need for optical character recognition (OCR).

In various aspects, document images are encoded as a whole using runlength histograms. Multiple regions in the document image are extracted at one or multiple scales. For each region, one or more runlength histograms are generated. All extracted histograms are subsequently concatenated to form the document image representation.

Original images to be characterized in this way may be received by the apparatus in any convenient file format, such as JPEG, GIF, JBIG, BMP, TIFF, or other common file format used for images and which may optionally be converted to another suitable format prior to processing. Images may be individual images or video images and can be scanned images, photographs, graphics, text images, combinations thereof, or the like. In general, each input digital image includes image data for an array of pixels forming the image and may be in the form of a bitmap. The image data may include colorant values, such as grey levels, for a single color separation (e.g., for black and white images) or for each of a set of color separations, such as RGB, or be expressed in another other color space in which different colors can be represented. In general, the colorant values can be the optical density value of any single color channel, however expressed (RGB, $L^*a^*b^*$, YCbCr, etc.).

In one implementation, the images are scanned document images in the form of a bitmap and may be images of documents which are predominantly or entirely text, such as scanned medical records, tax forms, business cards, bank checks, bills, or the like. In one aspect, the scanned documents have at least some structure, such as a template form (e.g., business form) which has various fields for user entries. The fields of the documents allow the template to be personalized, prior to scanning, and in the exemplary implementation, are at least partially completed by a user, making each scanned copy of the template form slightly different but still retaining the same general structure. The content of the fields may have been generated by handwriting, typing, online entry, or the like. A single document may comprise several pages, each page forming a respective document image when scanned.

A runlength histogram is a histogram of the occurrences of runlengths. A runlength is the number of successive pixels in a given direction in a scanned image that belong to the same quantization interval. While in one embodiment, a histogram bin may be provided for each possible run length from 1 to the maximum number of pixels in the direction under consideration, it is more convenient to quantize the range into a limited number of intervals, as described below.

With reference to FIG. 1, an exemplary apparatus for generating an image representation is illustrated. The apparatus may be embodied in one or more electronic processing devices, such as the illustrated computer 10. The computer may include a display 12 or other output device for displaying or otherwise generating a human-perceptible output and a keyboard 14 or other user input device for receiving user input. The electronic processing device 10 is configured to implement an image representation generator 16. The electronic processing device 10 may be the illustrated computer, or another electronic processing device such as a production imaging manager of a document scanning system (e.g., the Xerox XPIM platform), a network server, Internet-based server, personal data assistant (PDA), cellular telephone, or the like.

The computer 10 is configured for receiving an original image 18 for which a representation is sought and storing the image in memory such as data memory 20 and for storing and/or outputting a representation 22 of the image generated by the image representation generator 16. The image 18 can be input from any suitable image source 24, such as a workstation, database, scanner, fax machine, memory storage device, such as a disk, camera memory, or the like.

In the exemplary embodiment, the image source 24 is a scanner which is communicatively linked to the computer 10 by a wired or wireless link 26, such as a cable, telephone line, local area network, or wide area network, such as the Internet through a suitable input/output (I/O) connection 28, such as a modem, USB port, or the like.

As is known in the art, in a typical scanner, a document sheet is illuminated and the light reflected from the document sheet is recorded by a photosensitive device such as a CCD (charge coupled device) or CMOS (complementary metal oxide semiconductor) array (also known as a contact image sensor (CIS)), to be converted to digital image data. Successive narrow strips of the document sheet are illuminated as the sheet is moved through a document handler, or the photosensitive device is moved relative to a platen on which the document sheet is placed. These narrow strips of document image are then assembled by software into a complete image representative of the original document.

The image representation generator 16 may be embodied in hardware or software or a combination thereof. As shown, the representation generator 16 is in the form of software components stored in main memory 30 of the computer and which are executed by an associated processor 32, such as the computer's central processing unit (CPU). The components 20, 30, 32, of the computer 10 may communicate via a data control bus 34. Memories 20, 30 may be separate or combined and may be in the form of any type of computer readable medium such as random access memory (RAM), read only memory (ROM), magnetic disk or tape, optical disk, flash memory, holographic memory, or suitable combination thereof.

The exemplary image representation generator 16 includes instructions for generating a representation of the image 18.

Figure 2:
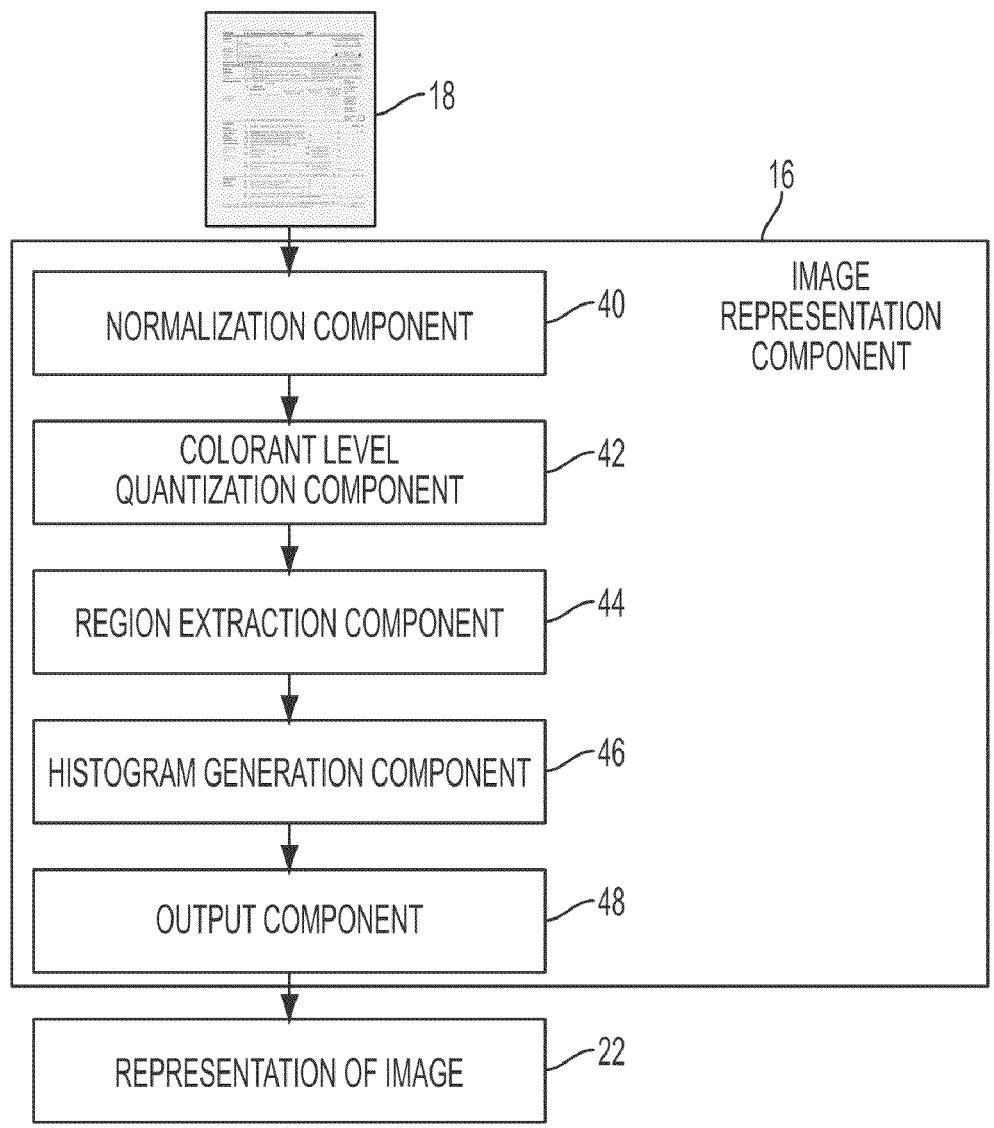
FIG. 2 is a functional block diagram of an image representation generator of the apparatus of FIG. 1, in accordance with one aspect of the exemplary embodiment.

As illustrated schematically in FIG. 2, the representation generator 16 includes various components for processing the image, including an optional normalization component 40, which normalizes the document image, an optional colorant level quantization component 42, which quantizes pixel colorant values (e.g., grey levels) in the document image (unnecessary for a binary image), a region extraction component 44, which extracts plural (generally multiple) regions in the document image, e.g., at two or more different scales, a histogram generation component 46, which extracts a runlength histogram in each region, and concatenates the histograms corresponding to the different regions to produce a vector. An output component 48 outputs a representation 22 of the image based on the concatenated histograms. The representation 22 may thus comprise a concatenated histogram (or more than one histogram) or normalized or otherwise modified derivation thereof which is representative of the whole image. The functions of the components 40, 42, 44, 46, 48 of the representation generator 16 are more fully described below. As will be appreciated, these components may be software components that may be suitably combined or split into subcomponents.

Figure 3:
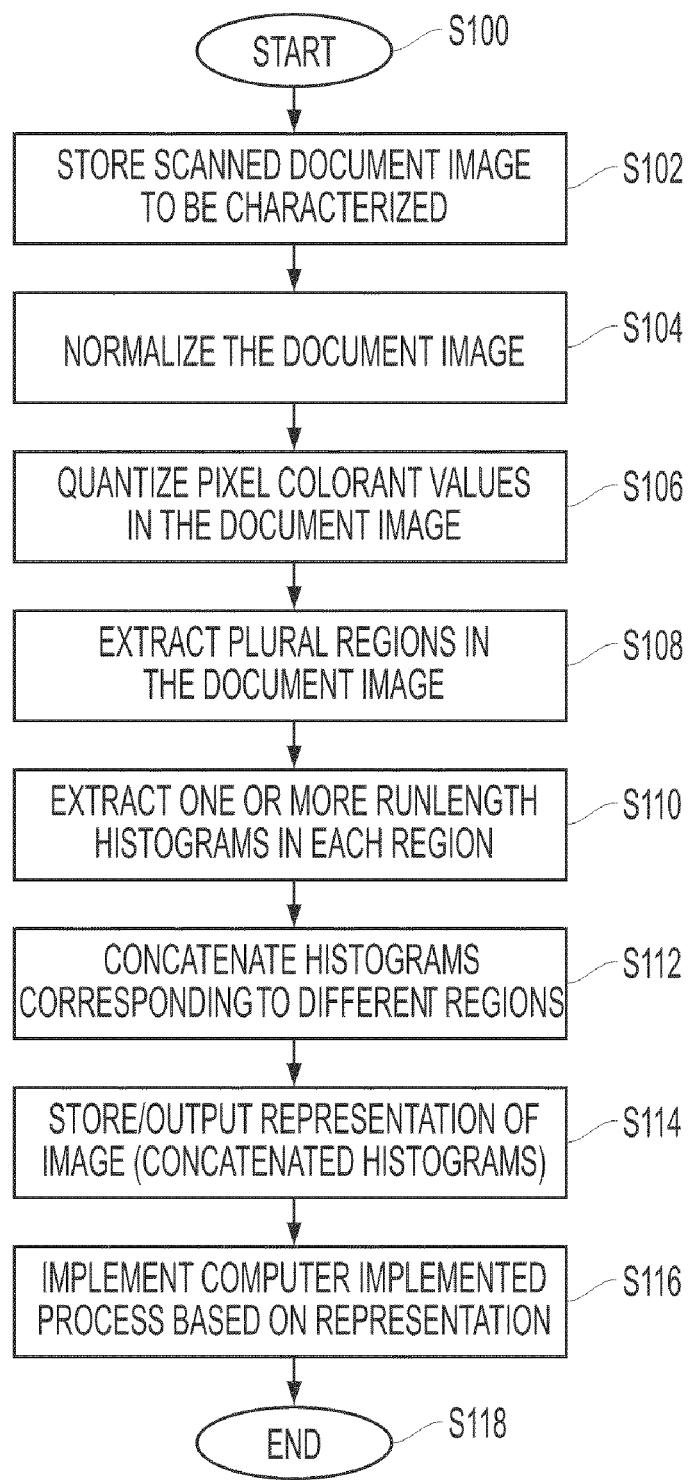
FIG. 3 is a flow diagram of an exemplary method for generating a representation of a digital image, which may be performed with the apparatus of FIG. 1.

An exemplary method for generating an image representation is briefly outlined in FIG. 3. The method begins at S100.

At S102, a scanned image 18 of a document to be characterized is received and may be stored in memory 20 during processing. The document to be processed may be selected by a user, e.g., via the keyboard, or automatically processed, e.g., in response to instructions sent with the document image.

At S104, the received document image is optionally normalized, which may include one or more of deskewing, resizing, or the like.

At S106, if the image is not already quantized, e.g., in the case of a binary image, the pixel colorant values (e.g., grey levels) in the document image may be quantized into N discrete levels where N may be, for example, at least 2, e.g., up to about 100, e.g., about 30 or less.

At S108, multiple regions in the document image are extracted.

At S110, a runlength histogram is extracted in each region.

At S112, histograms corresponding to the different regions are concatenated to form an image histogram. Normalization of the histograms may be performed, either before or after concatenation. The resulting image histogram, which may be stored in the form of a vector of values $(v_1, v_2, v_3, v_4 \ldots v_n)$ is thus representative of the entire, optionally normalized, document image 18.

At S114, a representation 22 of the image is output, based on the extracted runlength histograms and may be stored in memory 20, e.g., for further processing.

At S116, a computer implemented process may be performed which utilizes the image representation 22 thus obtained. For example, a clustering operation, classifying operation, or similarity determination may be performed. The image representation for one image can be compared with the image representation of one or more other images, derived in the same way, for clustering or similarity determinations. In other embodiments an image may be classified by inputting its image representation into a classifier which has been trained on the image representations of a set of manually labeled training images classified by document type. Specific data may then be extracted from the document, depending on its document type.

The method ends at S118.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for generating an image representation.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Further details of the exemplary method and apparatus now follow.

A. Image Normalization (Optional) (S104)

Optionally, the input images 18 may be normalized by performing one or more of the following normalization operations:

1. Cropping all images and/or rescaling them to a common size. Autocropping techniques are available which look for edges of the document, define a bounding box of minimum size which encompasses the edges and crop the image to the size of the bounding box. The cropped image can then be enlarged by rescaling to a selected size. Cropping operations may be performed when the document is too large or when the document is smaller (by padding). The size to which documents should be padded is close to or the actual size of the biggest document in the document set.

Cropping can be useful in the case where different images come in very different form factors. Specifically, different documents can have a different size. A US letter form is a different size from a check or an ID card. In order for the runlength techniques to be efficient, the system is most effective when processing elements which are the same size and of the same length: width ratio.

The autocropping may be performed by the scanner 24. However, the auto-crop feature of certain scanners can give totally different images depending on whether the auto-cropping works or not. For example, auto-cropping may not be useful in cases where a small document, such as an ID or business card is attached or positioned on a sheet of blank paper for scanning, in which case, the auto cropping tool may only find the boundaries of the page on which the small document is attached. Other sources of noise in the background scan can also prevent the document from being autocropped correctly.

2. Centering on the centre of gravity. This is particularly useful when dealing with copies or faxes of small hardcopy documents, such as ID cards. In such cases, the scanned document may form only a small part of the image and its location may vary quite considerably. The center of gravity of the image can be found by identifying the location at which equal numbers of active (non-white) pixels lie on either side for horizontal and vertical orientations. It is also useful for cases where an autocropping tool does not reliably identify the part of the image corresponding to the document to be cropped.

3. Correcting the skew. Various methods exist for correcting skew, such as by edge detection and rotation such that the edges of the scanned document are more closely aligned with horizontal and vertical orientations, or by rotating the image so that lines of text are horizontally arranged.

In some cases, e.g., where the original hardcopy documents are all of a fixed size and the scanner generates scanned images in which the document is reproducibly located in approximately the same position each time, normalization may not be needed and in some cases, is to be avoided.

B. Pixel Colorant Level Quantization (S106)

Even in the case of a hardcopy document which is in black and white, when it is scanned, the scanner will register different grey levels for the pixels. In an 8 bit system, 256 discrete grey levels are recognized, i.e., pixel values of the digital image can range from 0-255. In the case of a color image which has multiple color separations (e.g., 3 in the case of an RGB scanner) each color separation has 256 discrete pixel values. Thus, while digitally encoded images are already quantized (256 quantization levels for grey-level, $256^3=16,777,216$ for color images), runlength encoding benefits from a relatively small number of levels to be efficient. For images of black and white documents, it is convenient to use only two quantization levels, which is equivalent to binarizing the image. For color images, in one implementation, only one of the color separations is considered (e.g., only R) and the range of pixel values is quantized into N levels, N being a positive integer, e.g., from 2-10. Each pixel in the image is thus represented by one of the N quantized levels. It is to be appreciated that although using more quantization levels can give more information, it can result in the introduction of too much noise. Initial tests using only one of the RGB components has shown good results. In other embodiments, two or more of the color separations are quantized. For example, if each of the RGB components is assigned to one of two colorant quantization levels, this results in $N=2\times2\times2=8$ possible quantized values.

C. Region Extraction (S108)

Figure 4:
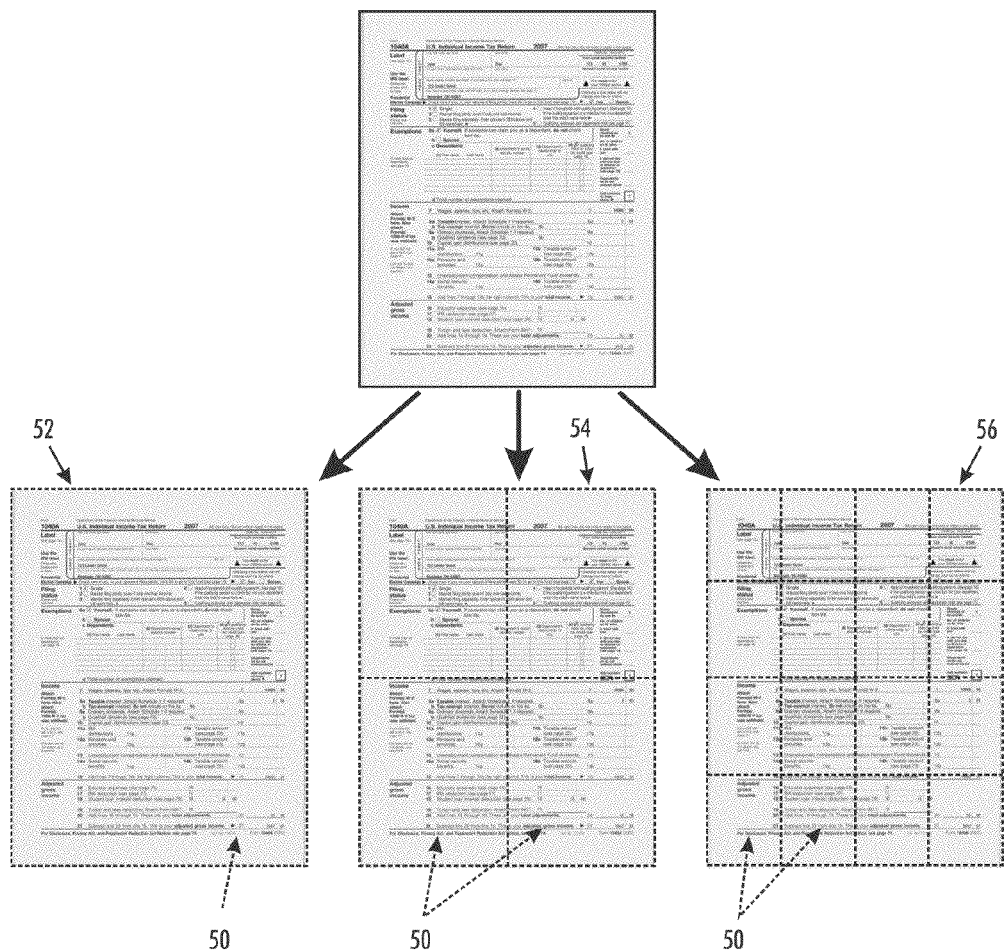
FIG. 4 illustrates subdivision of an exemplary image into regions at different scales.

As illustrated in FIG. 4, a set of regions 50 in the image is then extracted. The regions are obtained by partitioning the image. The image may be partitioned regularly, e.g. into 4×4 regions. Irregular partitioning methods could alternatively be used, e.g. a partitioning that ensures that all regions contain (approximately) the same number of pixels.

Multiple partitions of the image can be generated, at different scales. As a result, at least some portions of the image are included in more than one region. FIG. 4 illustrates an exemplary scanned image 18 which is subdivided into regions at different scales. The following partitions are illustrated: 1×1 (whole image), 2×2 and 4×4, designated by numerals 52, 54, and 56, respectively. This corresponds to 1×1+2×2+4×4=21 regions. The regions at different scales overlap, and are sub-regions of larger regions. In other embodiments, at least some of the regions are at least partially overlapping. For example, regions obtained by partitioning the image into 3×3 regions would partially overlap regions generated by partitioning at 2×2. Alternatively, regions of the same or different sizes may be offset. In general, the regions together encompass the entire, optionally normalized, document image. The exemplary regions are rectangular-shaped blocks although it is to be appreciated that other shapes of region are also contemplated, such as triangles, squares, hexagons, irregular shapes, combinations thereof, or the like.

By generating histograms for different regions 50 of the image 18 and optionally at different scales, differences between images which relate to the document type are reflected in the encoding. When dealing with structured documents, the documents may have different level of structure. For example, the reference number of a form may appear somewhere in the top left quadrant, whereas the title may appear at the top near the center. However, because the scanning procedure can result in some shifting of the document content, a feature such as the title may not always appear in the same region if the scale is small (i.e., where the image is divided into a large number of regions). Additionally, the title may appear on page one of the document only. Thus, different features influence the histograms differently at different scales as well as in different locations. While runlengths may be computed without partitioning the document image into plural regions (i.e., using the whole document), results suggest that that considering partitioned regions at different scales is particularly beneficial for structured content, such as forms.

D. Runlength Encoding of Regions (S110)

In each region 50, a runlength histogram is extracted. Specifically, run lengths are extracted by scanning each line of pixels in the region in a selected direction and identifying runs of pixels. A run is a sequence of pixels with the same colorant quantization value in a selected direction (e.g. horizontal, vertical, diagonal or anti-diagonal). The length of a run is the number of pixels such a sequence contains. In the case of binary images, each run is either all black pixels (quantization value=0) or all white pixels (quantization value=1). More generally, where two or more colorant quantization levels are employed, the pixels in a run all have the same quantization value. The runlength histogram is a histogram of the number of runs for each of M lengths of the runs. In one embodiment, the lengths of the runs are quantized to reduce the number of histogram bins. The quantization may be linear and divide the range of possible run lengths into equal sized intervals. Or, the quantization may be logarithmic or otherwise non-uniformly split to provide discrimination among the more frequently occurring run lengths. In a logarithmic manner, the quantization may be as follows:

| | Quantization Level/value | | | | | | | | | |
|---|---|---|---|---|---|---|---|---|---|---|
| | 1 | 2 | 3 | 4 | 5 | 6 | 7 | 8 | 9 | 10 |
| Pixel runlength | 1 | 2 | 3-4 | 5-8 | 9-16 | 17-32 | 33-64 | 65-128 | 129-256 | >256 |

This results in 10 intervals (M=10). As will be appreciated, a run cannot be longer than the total number of pixels in the orientation selected (e.g., rows, columns, or diagonal direction of the image). The exemplary 10 level quantization is suited to images containing on the order of 100K pixels. For higher resolution images, the maximum interval separator for the highest quantization level may be selected to be greater than 256 since the maximum run of pixels (the length of a line) is larger.

In one implementation, the histograms of black and white runs (in the case of a binary image) are separately computed in a plurality of directions, e.g., horizontal, vertical, diagonal and anti-diagonal directions. This provides 8 sub-histograms (i.e., horizontal black, horizontal white, vertical black, vertical white, diagonal black, diagonal white, anti-diagonal black, antidiagonal white). A region is thus described by the concatenation of these 8 sub-histograms. In the exemplary case of 10 pixel quantization levels, the resulting region histogram thus contains 10×8=80 values. In the general case, the number of values in the region histogram is M×N×L, where M is the number of pixel runlength quantization levels, N is the number of colorant quantization levels, L is the number of directions, and M, N, and L are all integers.

The region histogram can be normalized. Three approaches to normalization may be employed:

1) The region histogram is normalized globally so that the sum of the N×M×L values (80 in the example) is 1.
2) The sub-histograms corresponding to each direction and each pixel quantization value (e.g., black or white) are normalized independently.
3) Each direction is normalized separately: i.e., the sum of the N×M values is one (in the example, the sum of the 2×10=20 values corresponding to the black and white sub-histograms=1).

In general, only one of these approaches is used, although it is also contemplated that more than one normalization method may be employed. Normalization may be useful in some cases, but is not always necessary.

E. Global Image Representation (S112)

The final image representation 22 may simply be a concatenation of the region histograms corresponding to each of the regions 50. Or, its dimensionality may be reduced, e.g., through principal component analysis, to a fixed number of elements.

F. Applications

1. Image retrieval: the distance between two images can be defined as a distance between their histogram representations 22. Several suitable measures of similarity/distance between histograms including dot product, Bhattacharyya distance, Kullback-Leibler divergence (symmetrized or not), Jensen-Shannon divergence or the $chi^2$ distance, and the like may be used in computing similarity. For example, a large set S of images 18 and their corresponding histogram representations 22 are stored in memory. A user may input a new image or select one of the set to be used as a target image. Similar images are automatically retrieved from the set, based on the similarity of their histogram representations to that of the target image. For example, the apparatus retrieves images whose histogram representations equal or exceed a threshold of similarity. Alternatively, the 10 images (or any other selected number) with the highest similarity measure may be retrieved from the set. A component for image retrieval may be included in the representation generator or may be a separate component of the same or a separate computer. The exemplary method has been found to be effective for this application.

Figure 5:
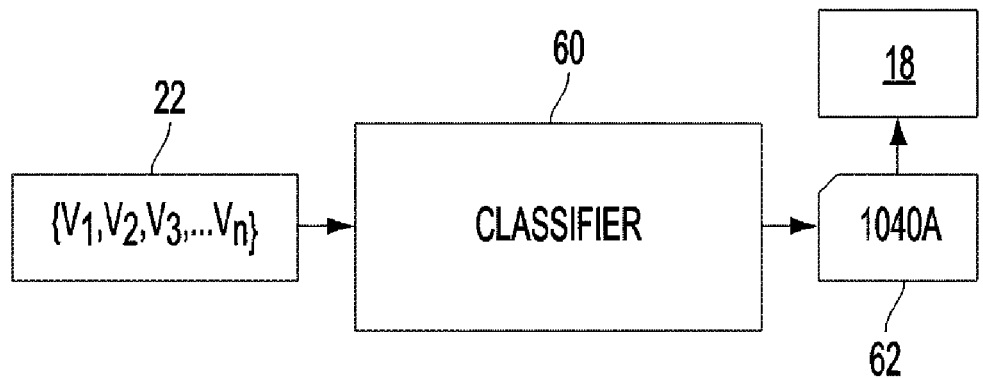
FIG. 5 graphically illustrates an exemplary classifier which may be incorporated into the apparatus of FIG. 1 or communicatively linked thereto.

2. Image classification: the histogram representations of the image may be fed to virtually any discriminative classifier 60, as illustrated schematically in FIG. 5. Exemplary classifiers may be based on discriminative models or generative models, such as sparse logistic regression, linear discriminant analysis, neural networks, support vector machines, naive Bayes, or the like. For example, the classifier may be trained with images manually assigned to one of a set of classes, such as in the case of tax forms, there may be about 20 classes corresponding to 1040-page 1, 1040-page 2, 1040a-page 1, 1040-page 2, Schedule A, Schedule B, etc, respectively. The classifier assigns a class label 62 to a new image, based on its vector representation. The classified images may be presented to a user for review, e.g., on the display 12. The classifier 60 may be included in the representation generator 16 or may be a separate component of the same computer 10 or a separate, communicatively linked computer. An example of the application of the method to classification is given below.

3. Image clustering: as the image representation 26 is non-negative, it is well-suited to non-negative matrix factorization techniques such as Probability Latent Semantic Analysis (PLSA) clustering. The computer 10 or a communicatively linked computer may include a component for image clustering. Such a component may generate a matrix of the computed distances between images in a set. The matrix is processed, e.g., with PLSA, to cluster the images.

An advantage of the exemplary method over existing methods of classification, such as generic visual classification (GVC) is that runlength histograms are typically four to five times faster to compute than a GVC representation based on Fisher kernels.

The following example illustrates the application of the exemplary method to a classification problem.

EXAMPLE

The method was tested on databases containing document images, such as tax forms, ID cards, contracts, and medical forms. To simulate the ability of the method to classify documents, a portion of the images in the database were each manually categorized into one of a set of classes. These labeled images were used to train a classifier (based on sparse logistic regression). The trained classifier was then used to classify unlabeled document images and the precision of the method was assessed by manually reviewing the assigned classes. Results for the following three databases are provided by way of example:

Database 1: this database contained 5,590 images of 20 types of income tax forms. 10 images per category were randomly sampled for training (a total of 200 training images). The remaining images were used for testing.

Database 2: This database contained over 10,000 images of various types of documents of the type normally processed by a commercial corporation, such as ID cards, contracts, and the like.

Database 3: This database contained over 3,000 images of various types of documents typically processed by another corporation which were primarily different types of forms.

In each case, 10 fold cross-validation was used on the database (the experiments were repeated 10 times with 10 different samplings). Three different methods were assessed:

Method 1 (Comparative) was based on the Generic Visual Categorizer (GVC), as described in above-mentioned U.S. Pub. No. 2007/0258648, entitled GENERIC VISUAL CLASSIFICATION WITH GRADIENT COMPONENTS-BASED DIMENSIONALITY ENHANCEMENT, by Florent Perronnin. In this method, an image classification system includes a plurality of generative models which correspond to a plurality of image classes. Each generative model embodies a merger of a general visual vocabulary and an image class-specific visual vocabulary. A gradient-based class similarity modeler includes a model fitting data extractor that generates model fitting data of an image respective to each generative model and a dimensionality enhancer that computes a gradient-based vector representation of the model fitting data with respect to each generative model in a vector space defined by the generative model. An image classifier classifies the image respective to the plurality of image classes based on the gradient-based vector representations of class similarity.

Method 2: this method used runlength histograms obtained as described in the exemplary method, however at a single scale (no partitioning of the image into regions).

Method 3: this method used multi-scale runlength histograms, obtained as described in the exemplary method, using partitioning as illustrated in FIG. 4.

Table 1 shows the results (error rates—i.e., percentage of images wrongly classified) obtained with the three methods.

TABLE 1

|  | Database 1 | Database 2 | Database 3 |
|---|---|---|---|
| Method 1 (GVC) | 0.00% | 3.55% | 11.69% |
| Method 2 (Single scale RL) | 0.39% | 8.63% | 18.76% |
| Method 3 (Multi-scale RL) | 0.00% | 3.96% | 11.80% |

As can be seen from the results, the exemplary method gives similar results to GVC, when multiscale histograms are employed. For database 1, single scale runlengths also give good results, but for databases 2 and 3, the benefit of multi-scale runlength histograms over single scale runlength histograms is evident.

As will be appreciated, these methods only used a limited number of images for training the classifier. In a practical implementation, a larger number of training images could be used, which could yield lower error rates.

Some of the advantages of the exemplary method with respect to GVC are as follows:

1. The exemplary image representation does not require the classifier to learn a model, while GVC requires the learning of a "visual vocabulary". It is contemplated that the exemplary method could employ learning of the optimal runlength intervals. However, as shown in Table 1, good performance can be achieved without this additional step.

2. The cost of computing the proposed representation is significantly lower than the cost of computing the GVC representation (based on Fisher kernels). For example, on a 2.4 GHz Opteron machine, computing the multi-scale runlength takes approximately 50 ms per image, while it takes on the order of 175 ms for GVC.

3. Having computed the representation of an image, it is easy to compute the representation of the same image rotated by 90, 180 or 270 degrees, simply by permuting some of the histograms. This makes for very fast processing in the case where the scanning direction is unknown. In the case of GVC, four representations would have to be generated separately from scanned images and employed for the classification problem.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for generating a representation of an image comprising:
   receiving an image for which a representation is to be generated;
   partitioning the image into a plurality of regions;
   for each of the plurality of regions of the image, computing a runlength histogram;
   generating a representation of the image based on the runlength histograms, comprising concatenating the runlength histograms from the plurality of regions; and
   outputting the representation of the image.

2. The method of claim 1, wherein the regions are at a plurality of scales, whereby at least some of the regions are at least partially overlapping.

3. The method of claim 1, further comprising normalizing the image prior to computing the runlength histograms.

4. The method of claim 1, wherein the computing of the runlength histogram comprises computing a runlength sub-histogram for each of a plurality of pixel colorant quantization levels and combining the sub-histograms.

5. The method of claim 4, further comprising, prior to the computing of the runlength histograms, quantizing colorant values of pixels of the image into a plurality of quantization levels.

6. The method of claim 1, wherein the computing of the runlength histogram comprises, for each region, computing a runlength sub-histogram for each of a plurality of directions.

7. The method of claim 1, wherein each runlength histogram comprises a histogram of a number of runs of pixels of a same pixel colorant quantization level for each of a set of quantized run lengths.

8. The method of claim 7, wherein the quantization of runlengths is logarithmic.

9. The method of claim 1, further comprising normalizing the runlength histograms before concatenation or normalizing the concatenated runlength histograms.

10. The method of claim 1, wherein the image comprises a scanned image of a text document.

11. The method of claim 10, wherein the document comprises at least one of a form, a business record, an identification card, and a business card.

12. The method of claim 1, wherein the image comprises a bitmap.

13. The method of claim 1, wherein the image representation comprises a vector of values.

14. The method of claim 1, further comprising associating the representation of the image with the image in memory.

15. A method of classifying images comprising:
  generating image representations for a plurality of training images by the method of claim 1;
  training a classifier based on the image representations and respective class labels of the training images; and
  with the trained classifier, assigning a class to a new image based on its image representation.

16. A computer program product comprising a non-transitory recording medium which encodes instructions for performing the method of claim 1.

17. A computer device comprising:
  memory which stores instructions for performing the method of claim 1; and
  a processor in communication with the memory for executing the instructions.

18. A method comprising:
  receiving first and second images to be compared;
  partitioning each of the images into a plurality of regions;
  for each of the plurality of regions of the first image, computing a respective first runlength histogram;
  generating a representation of the first image based on the runlength histograms computed for the first image, comprising concatenating the first runlength histograms from the plurality of regions of the first image;
  for each of the plurality of regions of the second image, computing a respective second runlength histogram;
  generating a representation of the second image based on the runlength histograms computed for the second image, comprising concatenating the runlength histograms from the plurality of regions of the second image; and
  computing a measure of similarity between the first and second images based on the image representation of the first image and the image representation of the second image.

19. A computer implemented apparatus for generating an image representation of a document image comprising:
  memory for storing a received document image;
  a region extraction component which extracts a plurality of regions in the document image, at two or more different scales, whereby at least some of the regions are at least partially overlapping;
  a histogram generation component which extracts a runlength histogram in each region and combines the histograms corresponding to the different regions;
  an output component which outputs a representation of the image based on the combined histograms; and
  a processor which implements the components.

20. The apparatus of claim 19, further comprising:
  a normalization component for normalizing the document image.

21. The apparatus of claim 19, further comprising:
  a colorant level quantization component which quantizes pixel colorant values in the document image into a plurality of pixel colorant quantization levels, the histogram generation component generating a histogram for each of the plurality of pixel colorant quantization levels.

22. A method for generating a representation of an image comprising:
  scanning a document to generate an image of the document;
  quantizing pixel colorant values into N colorant quantization levels;
  partitioning the document into regions at a plurality of different scales;
  for each region of the image, computing a runlength histogram comprising values for each of the N colorant quantization levels and for each of L directions, were N and L are respectively at least two; and
  generating a representation of the document image based on a combination of the runlength histograms corresponding to different regions.

23. The method of claim 22, wherein the partitioning of the document into regions at a plurality of different scales results at least some of the regions being at least partially overlapping.

24. A computer program product comprising a non-transitory recording medium which encodes instructions for performing the method of claim 22.

* * * * *